(12) United States Patent
Stack et al.

(10) Patent No.: US 11,579,709 B2
(45) Date of Patent: Feb. 14, 2023

(54) DEVICE FOR CONTROLLING UP TO SIX DEGREES OF FREEDOM

(71) Applicant: SUBLIGHT DYNAMICS INC., Bristol, PA (US)

(72) Inventors: Daniel Harrison Stack, Philadelphia, PA (US); Benjamin Allen Stack, Philadelphia, PA (US)

(73) Assignee: SUBLIGHT DYNAMICS INC., Freeport, ME (US)

(*) Notice: Subject to any disclaimer, the term of this patent is extended or adjusted under 35 U.S.C. 154(b) by 0 days.

(21) Appl. No.: 17/264,699

(22) PCT Filed: May 30, 2019

(86) PCT No.: PCT/US2019/034760
§ 371 (c)(1),
(2) Date: Jan. 29, 2021

(87) PCT Pub. No.: WO2020/027906
PCT Pub. Date: Feb. 6, 2020

(65) Prior Publication Data
US 2021/0311565 A1    Oct. 7, 2021

Related U.S. Application Data

(60) Provisional application No. 62/711,553, filed on Jul. 29, 2018.

(51) Int. Cl.
*G06F 3/0338* (2013.01)
*A63F 13/218* (2014.01)
*G01L 5/22* (2006.01)

(52) U.S. Cl.
CPC .......... *G06F 3/0338* (2013.01); *A63F 13/218* (2014.09); *G01L 5/223* (2013.01); *A63F 2300/1006* (2013.01); *A63F 2300/1043* (2013.01)

(58) Field of Classification Search
CPC ................. G06F 3/0338; A63F 13/218; A63F 2300/1006; A63F 2300/1043; G01L 5/223; G01L 5/16; G05G 2009/0474; G05G 9/04737
See application file for complete search history.

(56) References Cited

U.S. PATENT DOCUMENTS

| | | | | |
|---|---|---|---|---|
| 4,258,720 A * | 3/1981 | Flowers | ............... | A61B 5/1073 600/587 |
| 2005/0017419 A1* | 1/2005 | Gleu | ............... | B60G 17/01933 267/113 |
| 2007/0060391 A1* | 3/2007 | Ikeda | ............... | A63F 13/06 463/46 |
| 2013/0068037 A1* | 3/2013 | Siklos | ............... | G01L 5/1627 73/862.045 |
| 2017/0368451 A1* | 12/2017 | Tiffany | ............... | A63F 13/22 |
| 2018/0105407 A1* | 4/2018 | Porter | ............... | B62D 6/10 |

* cited by examiner

*Primary Examiner* — Mark W Regn
(74) *Attorney, Agent, or Firm* — Allen, Dyer, Doppelt + Gilchrist, P.A.

(57) ABSTRACT

Provided are embodiments of control devices capable of simultaneously measuring six degrees of freedom and electronic systems comprising the control devices. In some embodiments, the control devices are useful for controlling and/or directing movement of vehicles and virtual entities through operation of the control device with a computer processor, computer interface and, optionally a display.

20 Claims, 14 Drawing Sheets

DEVICE FOR CONTROLLING UP TO SIX DEGREES OF FREEDOM

CROSS-REFERENCE TO RELATED APPLICATIONS

This application is a National Stage application filed under 35 U.S.C. § 371 of International Application No. PCT/US2019/034760, filed on May 30, 2019, which claims priority to U.S. Provisional Application No. 62/711,553, filed Jul. 29, 2018, the contents of each application is hereby incorporated by reference in its entirety.

FIELD OF THE DISCLOSURE

The present disclosure generally relates to control devices, and specifically relates to a control device and methods of using the same for simultaneous control of up to three translational and three rotational axes. The disclosure also relates to a system comprising the same and software that executes steps to relay electrical signals to processor capable of movement of a vehicle, robot or virtual entity.

BACKGROUND

The field of controls for agile craft and other multi-degree of freedom applications has a history dominated and stagnated by airplane flight sticks and remote control transmitters for model airplanes. These controls are very well-adapted for their narrow use cases in winged aircraft, which only require pitch, yaw, roll and a number of single-axis thrusters and airflow control surfaces, but do not address less limited applications allowing more degrees of freedom.

In especially agile planes, side sticks, which measure force applied to a control handle as a means of flight control, are used instead of measuring motion of a control handle. Existing examples of these systems originated in military fighter craft, and consisted of resistive strain gauges measuring bending and torsional strain in the main structural stem of the side stick. The intent was two-fold, being advantageous in the agility and reliability of the sensors, and also in the small amount of space required to operate the device in a small cockpit. Said force-measurement based controls, when compared to motion-measurement based controls, are more customizable in feel, precision, and sensitivity while also being more agile, as the user can more quickly switch between input extremes. However, these devices are limited to three degrees of freedom, that being their intended use, and it being challenging to increase the number of degrees of freedom.

The commercial inertia behind these three degree-of-freedom control systems has been a detriment to the control of newer and far more agile flying craft such as quadcopters, zero gravity vehicles, and any other motion systems that allow for movement in more than three degrees of freedom. Many of these applications require up to six degrees of freedom comprising two types of motion: the rotational motions of pitch, yaw, and roll, and the translational motions of forward/backward along axis Y, up/down along the axis Z, and left/right side strafing along the axis X. Hereafter, the six degrees of freedom as a set shall be referred to as the 6DOF. To adequately control a system with this much agility requires the user to be able to input commands to all three translational axes and all three rotational axes simultaneously. As a result of the inertia of the older systems of control, the current trend is to simply add additional, separate inputs such as pedals, analog finger-operated sticks, head tracking, and eye tracking devices. All of these additions layered onto the vestigial systems of control quickly become non-intuitive and, as a result, these systems take a great deal of time in training on the part of the user to become a safe and effective operator.

Existing devices for hardware explicitly intended for 6DOF control occur significantly in the following two areas: the first being high stakes applications and the second being low stakes applications.

The first area is high stakes applications such as surgical robotics and government space agencies. Existing devices in this area prioritize extreme precision and repeatability at the expense of control agility and cost concerns. Disadvantages of these existing devices are that they use costly, complicated, high grade sensors that are difficult to machine and manufacture. These have included optical and magnetic systems, as well as high-grade six-axis fully-self-contained load cells, rated for positioning medical or industrial robotics. These systems are financially out of reach for all but the most well-funded large entities and government organizations. Additionally, these devices are often not well-balanced, forcing the user to apply unnecessary compensating moments to input a simple translation signal.

The second area is low stakes applications in virtual reality (VR) and computer aided design (CAD) view control. Existing devices for low stakes controllers prioritize low cost, but significantly at the expense of control precision and repeatability. Said controllers eliminate the costs and drawbacks of friction, backlash and flexing associated with linkage based recentering mechanisms, but significantly at the expense of important means of recentering and precision, relying on the user's visual frame of reference for feedback. This means of control works in the areas of simple VR gestural programs where small mistakes or errors in measurement are not crucially important because there is little at stake. Like some devices in the heretofore described higher-end areas of control, surgical robotics and space flight, these low end devices use the measurement of translational motion, but with far lower requirements for precision manufacture and repeatability. The disadvantages of these low stakes application devices is that they do not have any recentering, and therefore are not repeatable, being especially poor for flight and reference frame control. They also have a disadvantageous distance of measurement, which lowers the speed at which control can be changed from one extreme to another.

The area of middling stakes in between these two areas of high and low stakes is lacking in art and is the context of the invention. This middling stakes area, especially in the realm of flight and simulated flight control for highly agile craft, is where low cost, precision, control agility, intuitiveness, and repeatability need to balance for recreational consumers and professionals who fly drones, operate CAD programs, and use 6DOF flight simulators. With the rapidly expanding market for high agility quadcopters, space simulators, readily available CAD tools, and other 6DOF applications, there is an equally expanding need for a recentering, high precision, low cost control system which can handle the overlap of up to three simultaneous translational axes and up to three simultaneous rotational axes. However, it is challenging to create a device which has all of these qualities. Among the greatest challenges are lowering the cost of the triaxial force sensors which are difficult to manufacture. Additionally, it is challenging to balance the recentering mechanism for the input control such that it is intuitive for the user and does not cause mistaken inputs.

SUMMARY OF EMBODIMENTS

The present disclosure relates comprises a novel control device generally consisting of a control handle for the user to grip, wherein the center of the control handle is defined as the center of the gripped portion of the handle coincident with the control handle's longitudinal axis, and a means of measuring the six axes of force and moment input applied by the user to the control handle. The means by which five of the six axes of input are measured is by measuring the three axes of force, Fx, Fy, and Fz applied to two opposed origin points of force measurement collinear with the center of the control handle. By detecting opposing values of force, an additional two axes of the three rotational axes, Mx, My, and Mz, can be deduced. Splitting the measurement of the translational axes into opposing points allows the forces applied to the control handle to be balanced between the two points of measurement meaning that applying, through the center of the control handle, an external force creates motion of the control handle substantially limited to translational motion along the axis of the applied force, and balanced such that applying, about an axis passing through the center of the control handle, an external moment creates motion of the control handle substantially limited to rotational motion about the axis of the applied moment. Importantly, the invention accomplishes this without the need for complex, expensive, less-reliable linkages. Additionally, the use of force sensors rather than motion based sensors allows for extremely rapid changes between extremes of user input. Having only to traverse at most an inch of distance to change from one input extreme to another, allows for changes in direction of the craft or 6DOF application much faster than other control devices. Another advantage of using force sensors in the present invention, is that force sensors have effectively no moving parts, increasing the durability and useful lifespan of the device. Finally, the preferred embodiment utilizes parallel beam load cells, which are much cheaper to produce than existing triaxial force sensors.

In addition to the heretofore mentioned measurement of the two triaxial force sensors, an
additional sensor may be used to measure the remaining moment, completing the full set of six axes of measurement of the control handle: the forces Fx, Fy, Fz, and the moments Mx, My, and Mz.

Additionally, a plurality of digital and analog inputs for the users fingers may be disposed about the control handle to expand the controls available to the user without taking their hand off of the input.

Additionally, algorithms for adjusting the output signals of the control device may be included in the device or its software to provide greater adaptation of the device for an individual's preferences and the intended application.

In one example embodiment the control device comprises a first sensor element and a second sensor element, a control handle and a blind axis. Each of the first and second sensor elements are positioned parallel to one another. The control handle comprises a gripping portion adapted for a user grip and a center point. The center point is positioned within the gripping portion and centered along a longitudinal axis of the control handle. The blind axis is defined by a perpendicular line between the first and second sensor elements passing through the center point. In this example each of the first and second sensor elements define a plane. Each plane is positioned perpendicular to the blind axis. Each of the first sensor element and the second sensor element comprise at least one sensor capable of measuring at least one force in each plane.

As an example each of the first and second sensor elements comprises at least one sensor capable of measuring at least a perpendicular force along each plane. In an example each of the first and second sensor elements comprise at least a first plane sensor and a second plane sensor positioned such that the first plane sensor measures a first force and the second plane sensor measures a second force, the first and second forces are perpendicular to each other.

As an example the control device further comprises a first moment sensor measuring a moment or force around the blind axis. In a particular example, the first moment sensor is positioned proximate to or on the blind axis. In another particular example, the first moment sensor is positioned within the control handle and proximate to or on the blind axis. As an example the first moment sensor is a sensor chosen from: piezoelectric, capacitive, or resistive. In an example the first moment sensor and the at least one sensor are resistive sensors.

As an example the control device further comprises at least one sensor measuring a force along the blind axis. In an example the control device further comprises a sensor measuring a force along the blind axis in each of the first and second sensor element. In an additional example the control device comprises a sensor measuring a force along the blind axis in each of the first and second sensor elements and the sensor is positioned proximate to or on the blind axis.

In an example the control handle is a sphere, elongated member or a pocket.

As an example the control device further comprises comprising at least at first linkage and a second linkage. The first linkage and second linkages comprise an elastic suspension portion. The first linkage is positioned between and operably connected to the control handle and the first sensor element and the second linkage is positioned between and operably connected to the control handle and the second sensor element. In a particular example, the control device further comprises a third linkage and a fourth linkage. The third and fourth linkages comprise an elastic suspension portion. The third linkage is positioned between and operably connected to the control handle and the first sensor element, and the fourth linkage is positioned between and operably connected to the control handle and the second sensor element. In an example the elastic suspension portion comprises at least one elastically deformable member. In a particular example at least one of the first, second, third, and/or fourth linkages confer force to the first and second sensor elements from the control handle. In a particular example, the control device further comprises a second control handle, a handle connecting member. In this example, the handle connecting member rigidly connects the first control handle with the second control handle.

As an example, each of the first and second sensor elements comprise at least one triaxial force sensor.

In an example the control device further comprise an arm rest. The arm rest comprises a concave surface for receiving an arm. As an example the control device further comprises functional controls. The functional controls are disposed upon the control handle.

As an example the control device further comprises a base frame and at least a first linkage and a second linkage. Each first and second linkages comprise an elastic suspension portion. In this example the first linkage is positioned between and operably connected to the base frame and the first sensor element; and the second linkage is positioned between and operably connected to the base frame and the second sensor element. In a particular example the control device further comprises a second control handle, a handle connecting member. In this example the handle connecting member rigidly connects the control with the second control handle As an example embodiment of the control device the longitudinal axis of the control handle is parallel to the blind axis.

In an example the control device is operably linked to a computer processor.

DETAILED DESCRIPTION OF EMBODIMENTS

Definitions

Figure 1:
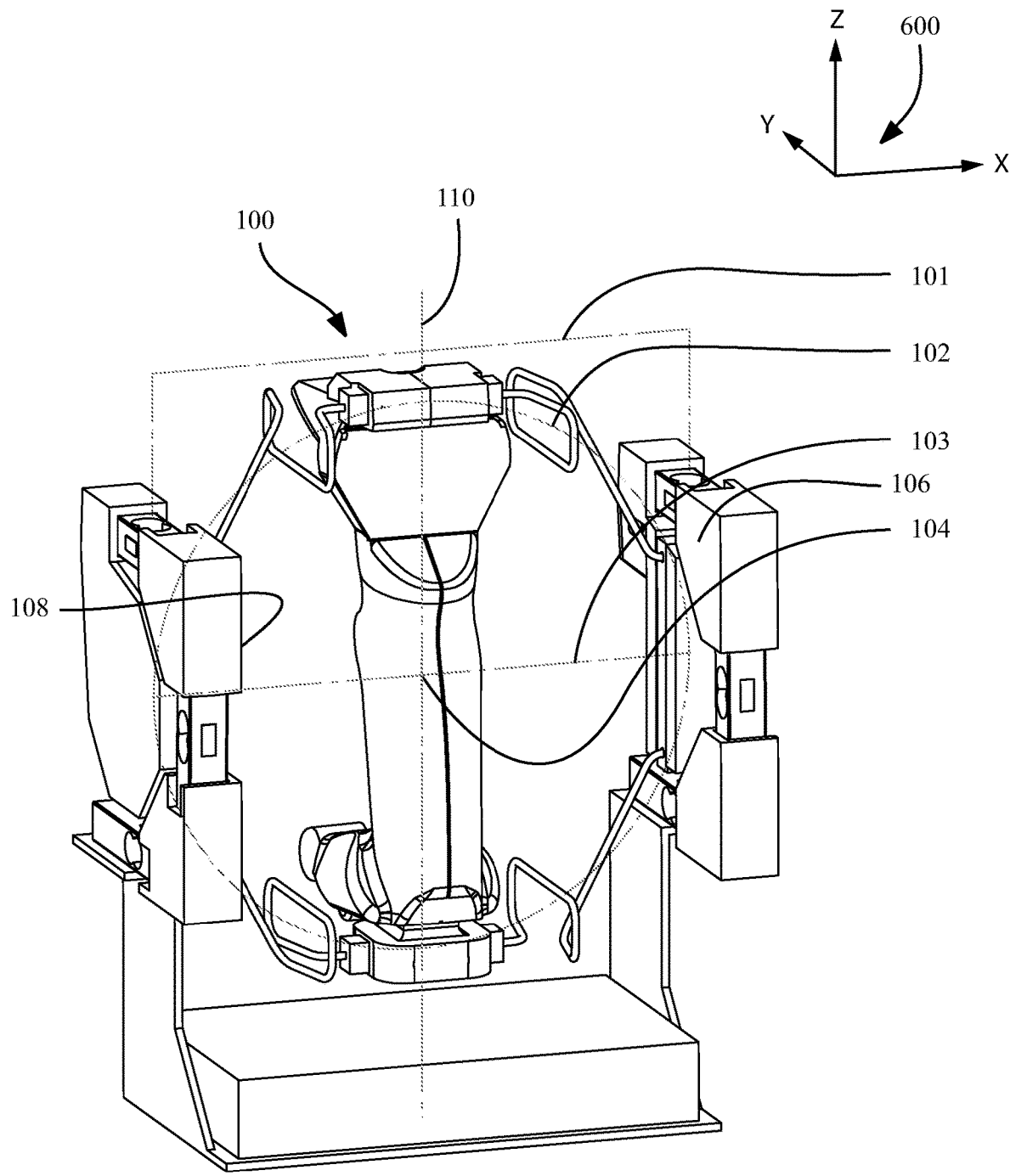
FIG. 1 is an isometric view of an example embodiment of a control device.

A "base frame" is defined as a structure fixed or weighted to a location external to the device. In some embodiments the base is positioned below the control handle. In some embodiments the base is fixed or weighted to resist movement when force is applied to the control handle. In some embodiments the base is physically connected to the control handle through a base linkage.

A "moment" as related to a force, is defined as rotational force about an axis a control handle is defined as a body, or set of bodies configured for grip by a user. In some embodiments the control handle is a body or set of bodies configured for grip by one or two hands of a user.

A "linkage" as used herein is defined as a component or set of components operably connects first and second element of the device. In some embodiments, a linkage is a component that operably connects the control handle with the base. In some embodiments, a linkage is a component that operably connects the control handle with at least one sensor element. In some embodiments, a linkage is an elastic member. In some embodiments the linkage is a spring made of music wire, elastic rubber, air tube, or magnetic field.

The terms "elastic suspension portion" is defined as an elastic region of the linkage. In some embodiments, the linkage comprises an elastic portion. In some embodiments, the linkage consists of an elastic suspension.

A "sensor" as used herein is defined as any electromechanical component that converts physical change or force into electrical signal capable of can be interpreted as input into a circuit. In some embodiments the sensor is an electromechanical component that converts, a physical force into one or a plurality of electrical signals.

The terms "force sensor" as used herein are defined as a sensor comprising a surface that converts force applied to the surface into an electrical signal. In some embodiments, the force sensor is a piezoelectric load cell, resistive load cell, or capacitive load cell.

The term "gripped portion" is defined as the area of the control handle configured for hand contact by the user.

As used herein the terms "degree of freedom" refer to an independent translational or rotational motion.

A "torque sensor" is defined as a sensor comprising a surface that converts moments of force into an electrical signal.

The term "external moment" a moment applied by a user of the control device.

The term "rigidly" is defined as having the property of being stiff or inflexible.

A "load cell" is defined as a transducer that is used to create an electrical signal in response to changes in the force applied along its direction of measurement.

An "axis of force" is defined as an axis along which a force is applied.

An "axis of moment" is defined as an axis about which a moment is applied.

The terms "resistive strain gauge" are defined as a transducer that produces changes in electrical resistance in response to mechanical strain.

The terms "capacitive strain gauge" are defined as a transducer capable of converting electrical capacitance in response to mechanical strain.

The terms "piezoelectric strain gauge" are defined as a transducer capable of producing an electrical charge in response to mechanical strain.

The terms "axial strain" are defined as (Should be replaced with "Torsional Strain" in patent claim) strain resulting from force applied along a body's longitudinal axis The terms "bending strain" are defined as strain resulting from force applied laterally to a body's longitudinal axis The terms "torsional strain" are defined as strain resulting from moments applied about a body's longitudinal axis The term "mobile object" is defined as a robot or vehicle, manned or unmanned, with the ability to move in space.

The term "virtual entity" is defined as an abstract item or thing existing in a computer system with a distinct and independent existence.

As used herein the term "web browser" means any software used by a user device to access the internet. In some embodiments, the web browser is selected from: Internet Explorer, Firefox, Safari, Chrome, SeaMonkey, K-Meleon, Camino, OmniWeb, iCab, Konqueror, Epiphany, Opera, and WebKit.

As used herein, the terms "an identifier associated with the control device" means any information related to identification information of the type of control device that is being used by a user to perform the method described herein or to run the software identified herein. In some embodiments, the identifier associated with the control device is selected from: a serial number of the control device, lot information of the control device, control device manufacturer, control device software applications, control device operating system, and user device owner.

Control Device

This disclosure relates to a control device 100 measuring three axes of force and up to three axes of moments applied to the device by a user. In some embodiments, the device is for controlling six degrees of freedom. The three axes are relative to reference coordinate system 600 illustrated in FIG. 1.

In some embodiments, the control device comprises an electrical circuit comprising any one, a plurality or all of the sensors disclosed herein in operable connection with the control handle. In some embodiments, the control device comprises one or a plurality of digital or analog control inputs on the control handle or operably connected to a circuit positioned within the handle. In some embodiments, one or a plurality of digital or analog inputs are positioned on the base. Some embodiments include other varieties of switches and inputs on or around the control handle as an application may require. In some embodiments, additional inputs are included and disposed on an upper portion of the control handle, such that a user does not need to relinquish control of the control handle to use a plurality of the switches or inputs.

Various embodiments may include an electronic circuit capable of amplifying any one or plurality of sensor signals and translating that data into signal output over wireless or wired communication to the intended application. In some embodiments, the electronic circuit should is positioned within the housing so as to distribute weight away from the control handle. In some embodiments, the electronic circuit is positioned external to the control handle.

Various embodiments may include housings to protect the sensors, electronics, structural elements, buttons, springs or other components of the invention.

Various embodiments may also include a means of securing the control device to a stationary object such as a base, such that the frame of the control device does not move when force is applied to the control handle. Said means of securing may include clamps, hook and loop fixtures, adhesives, weights, screws, or other means of fixture.

Various embodiments may include a plurality of rests, slings or pads for supporting and bracing the user's hand, arm, or body while using the control device, to reduce fatigue.

Various embodiments may include haptic, auditory, or visual indicators in the invention for communicating various functions of the invention to the user. These indications for example may provide feedback on the amount of force or moment being applied by the user to the control handle, the status or mode of the invention, or data from the application the invention controls.

Various embodiments may include physical adjustments for the allowed amplitude of travel of the control handle, the tension of the elastically deformable suspension, or other elements of the invention's function to suit the needs of the application and individual user.

Various embodiments may include variations in the shape, material, construction method, and size of the base frame, control handle, housings, and linkages between individual components. Various embodiments may also allow for variations in the design of the electronic components and force sensors, depending on the application and intended user.

Figure 2:
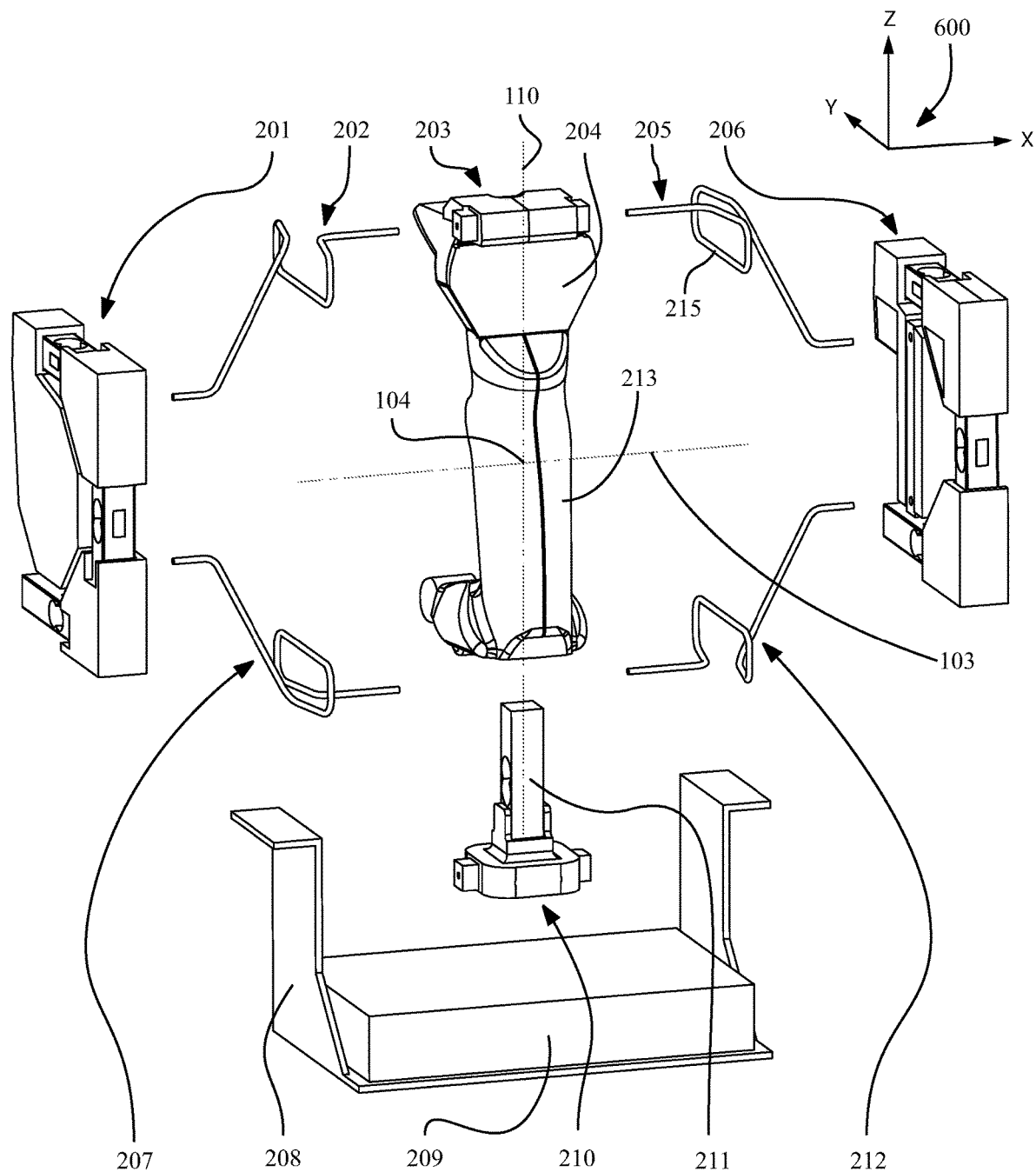
FIG. 2 is an exploded isometric view of an example embodiment of a control device.

The control device 100 is shown in FIG. 1 with reference to the reference coordinate system 600. A preferred location of the user interface for control device 100 is within circle 102, with a corresponding example of a center point 104 of the user interface. An exploded view of the control device illustrated in FIG. 1 is shown in FIG. 2. As shown in FIG. 2 the device 100 user interface may be a control handle 203. The control handle may be an elongated member, as shown in FIGS. 1-3 and 7-9, a sphere, as shown in FIGS. 10-13, a pocket or glove.

The device 100 includes the control handle 203, first and second sensor elements, 201 and 206 and a blind axis 103. Each of the first and second sensor elements 201 and 206 are positioned parallel to one another, in spaced apart relation along the X axis of reference coordinate system 600. Each of the first and second elements 201 and 206 define planes 106 and 108 (location shown in FIG. 1, opposite 106), parallel to the XY plane of reference coordinate system 600. Each of the first and second sensor elements, 201 and 206, may comprise at least one sensor capable of measuring at least one force in each plane.

Figure 6:
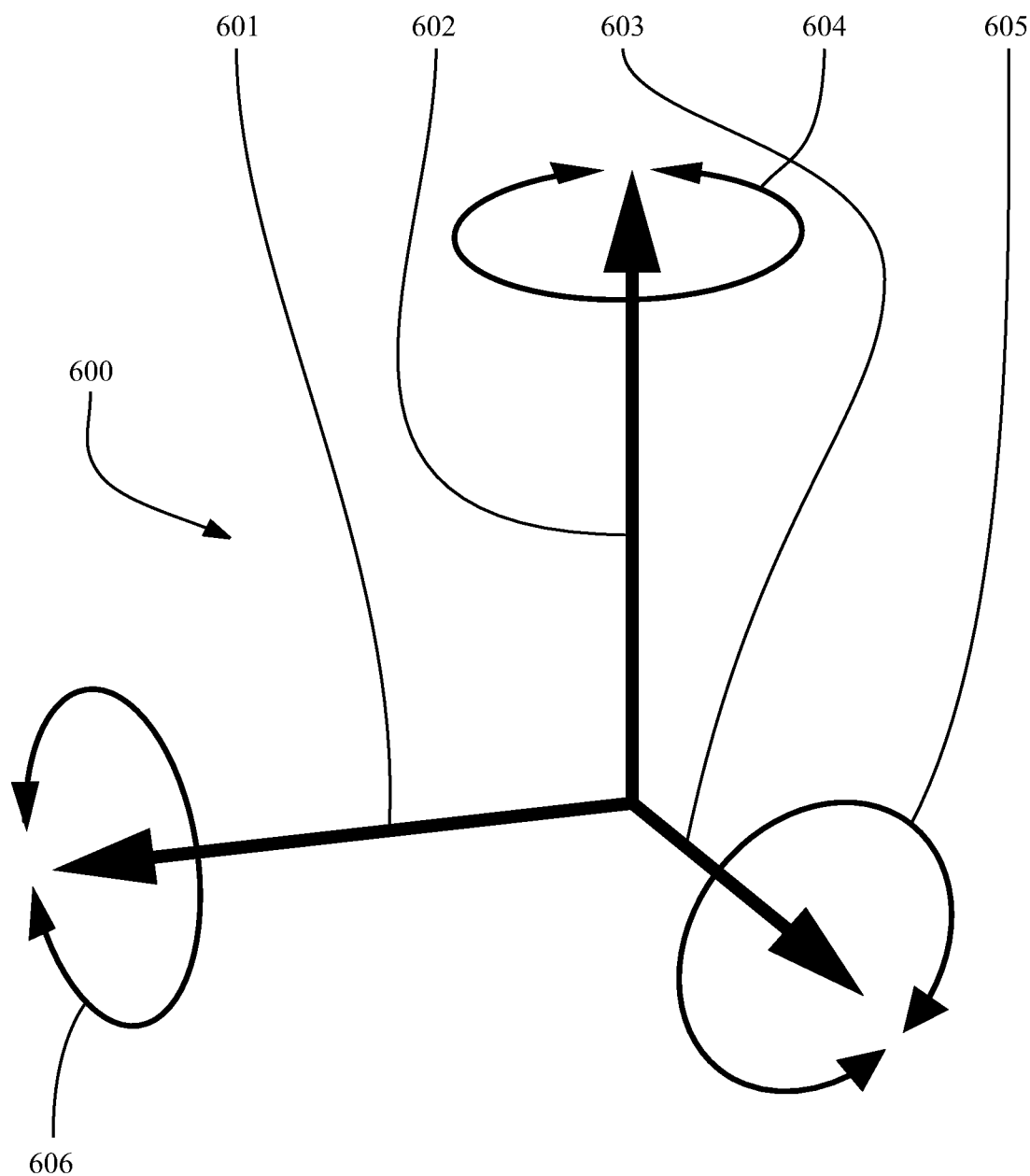
FIG. 6 is an illustration of an example of the coordinate axis.

The reference coordinate system 600 is illustrated in FIG. 6. This Cartesian coordinate system is the basis for descriptions of all six degrees of freedom associated with motion and forces within the device. For example the Y axis 603 may consist of forward and backward motion. The Z axis 602 may consist of up/down motion. The X axis 601 may consist of left/right slide motion. The Z rotation 604 may be the yaw axis. The Y rotation axis 605 may be the roll axis. The X rotation axis 606 may be the pitch axis. When referring to specific forces in a specific axis of freedom, forces in the Y axis may be referred to as Fy, forces in the Z axis may be referred to as Fz, and forces in the X axis may be referred to as Fx. Similarly, when referring to specific moments in this document, moments about the Z rotational axis may be referred to as Mz, moments about the Y rotational axis may be referred to as My, and moments about the X rotational axis may be referred to as Mx.

As shown in FIGS. 1 and 2, the control handle comprises a gripped portion 213 adapted for a user's grip and a center point 104 (shown in FIG. 2). The center point 104 is positioned within the control handle 203 and centered along a longitudinal axis 110 of the control handle 203. As shown in FIG. 2 the blind axis 103 is defined by a perpendicular line between the first and second sensor elements, 201 and 206, passing through the center point 104.

As shown in FIG. 2 the device 100 also comprises at least a first and second linkage, 202 and 205. The first and second linkages comprises an elastic suspension portion 215. The first linkage is positioned between and operably connected to the control handle 203 and the first sensor element 201. The second linkage 205 is positioned between and operably connected to the control handle 203 and the second sensor element 206. The device may further comprise at least a third and fourth linkage, 207 and 212, also comprising elastic suspension portions 215. The elastic suspension portion comprises at least one elastically deformable member 217. The third linkage 207 is positioned between and operably connected to the control handle 203 and the first sensor element 201. The fourth linkage 212 is positioned between and operably connected to the control handle 203 and the second sensor element 206. At least one of the first, second, third and/or fourth linkages 202, 205, 207 and 212, impart force to the first and second sensor elements, 201 and 206, from the control handle 203.

The control device 100 may be operably linked to a computer processor 209, illustrated in FIG. 2. The computer processor 209 is mounted to base frame 208.

Figure 10:
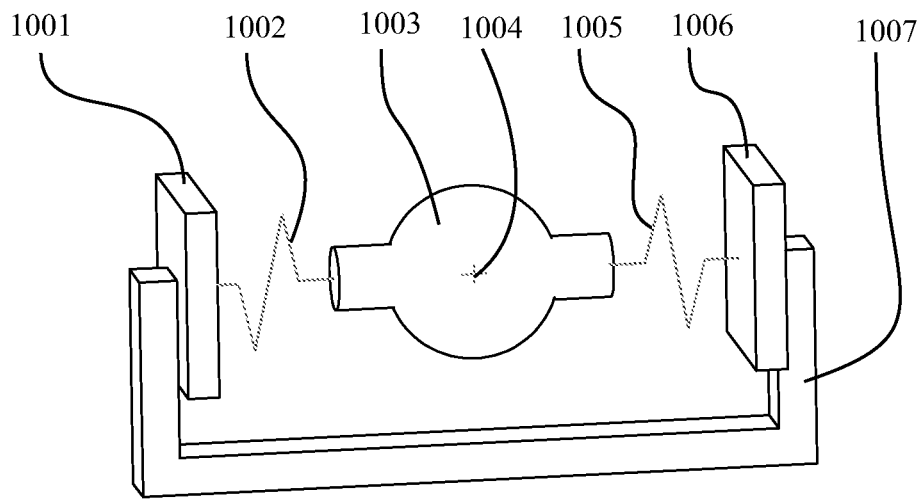
FIG. 10 is an isometric view of an example embodiment of the device illustrating an alternative example of the handle.

An additional embodiment of the device with the control handle 1003 shaped a sphere is shown in FIG. 10. This example control handle 1003 has a center point 1004. First and second linkages 1002 and 1005 are positioned between and operably connect to control handle 1003 and first and second sensor elements 1001 and 1006. Each first and second sensor element 1001 and 1006 is attached to base frame 1007.

Figure 8:
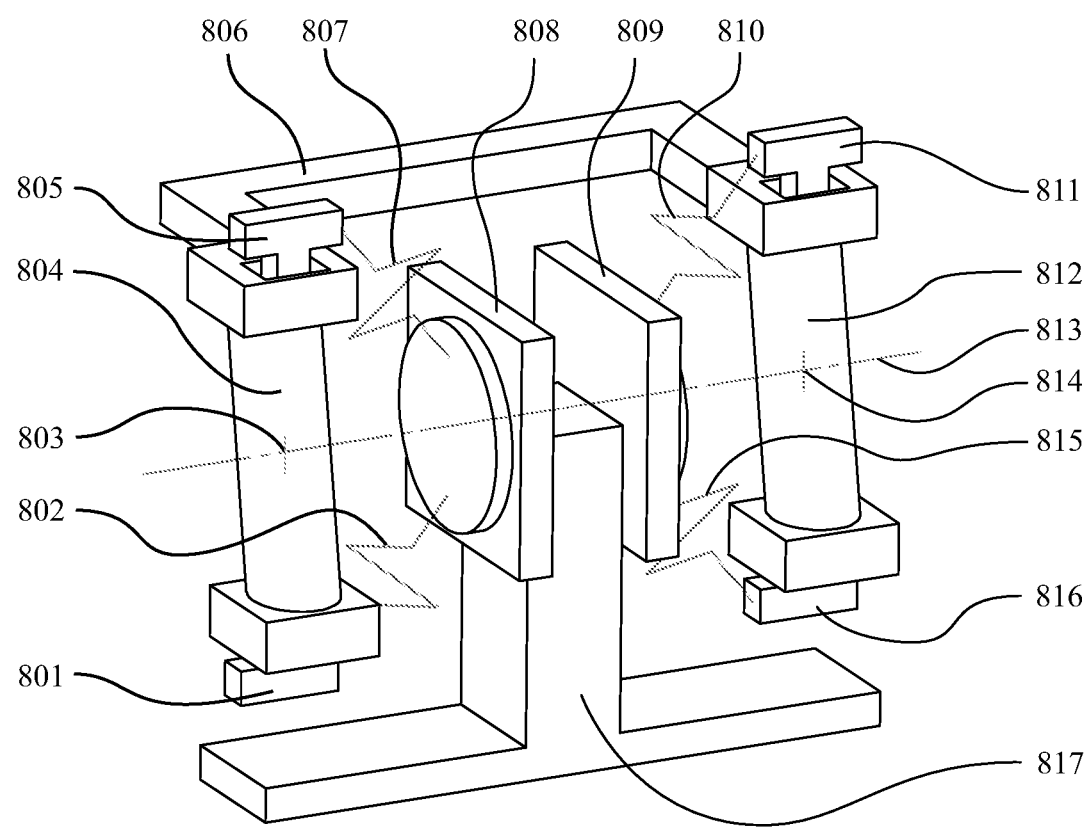
FIG. 8 is an isometric view of an example embodiment of a control device, illustrating two handles.

An alternative embodiment of device, illustrated in FIG. 8, further comprises a second control handle 812, and a handle connecting member 806. The handle connecting member 806 rigidly connects the control handle 804 and the second control handle 812. The control handle 804 has a first center point 803 and the second control handle 812 has a second center point 814. In this example the blind axis 813 is common to both the control handle 804 and the second control handle 812. First, second, third and fourth linkages, 802, 807, 810 and 815, are positioned between and operably connect to the base frame 817 and to the first and second sensor elements, 808 and 809 respectively. This example also illustrates locations for moment sensors, 801, 805, 811 and 806.

Figure 12:
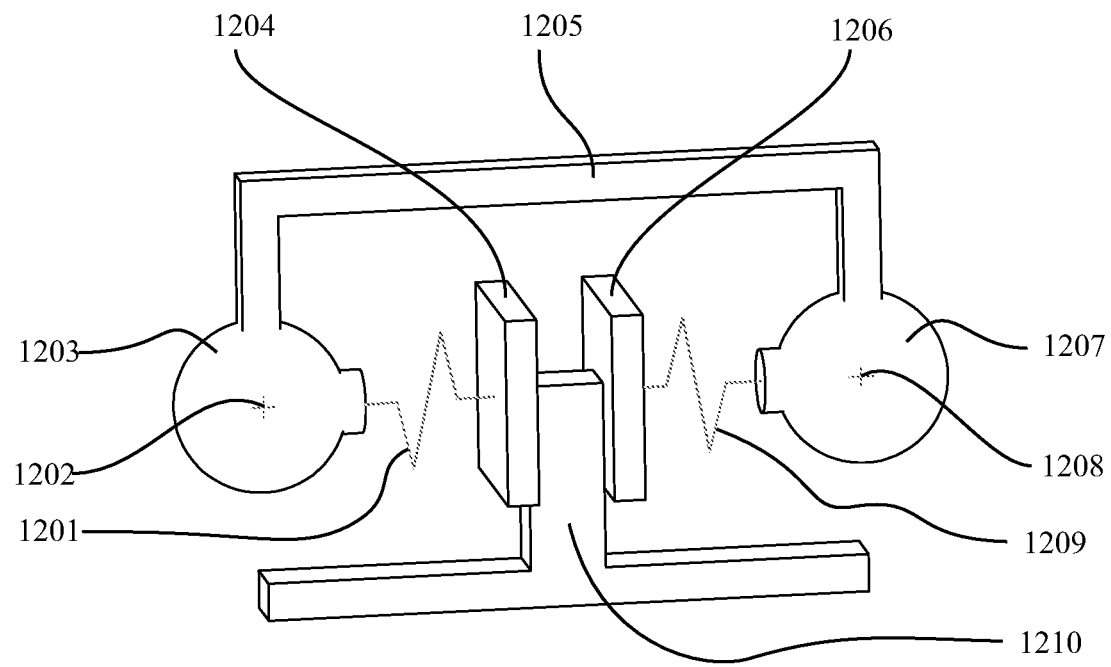
FIG. 12 is an isometric view of an example embodiment of the device illustrating an alternative example of two handles.

Yet an additional embodiment of the device, similar to FIG. 8 but with the control handles being spheres, is illustrated in FIG. 12. This embodiment of the device further comprises a second control handle 1207, and a handle connecting member 1205. The control handle 1203 has a first center point 1202 and the second control handle 1207 has a second center point 1208. First and second linkages 1201 and 1209 are positioned between and operably connected to the base frame 1210 and the first and second sensor elements, 1204 and 1206, respectively. First and second sensor elements 1204 and 1206 attach to base frame 1210.

Figure 4:
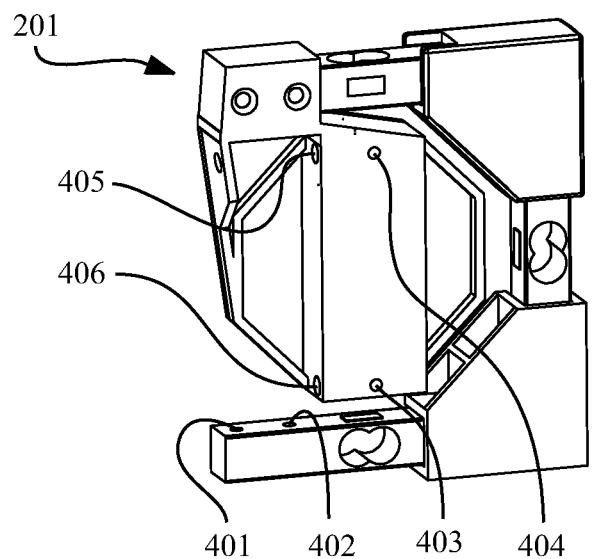
FIG. 4 is an isometric view of an example embodiment of a sensor element.

As shown in FIG. 2, the partially assembled device, may include control handle 203 supported by linkages 202, 205, 207 and 212, and sensor elements 201 and 206, which are attached to a base 208 via attachment members, such as bolts, located on the sensor elements. FIG. 4 illustrates an example embodiment of the sensor element 201. An example of the attachment of the sensor element 201 to base 208, may occur via bolts passing through holes 401 and 402 into the base 208 (shown in FIG. 2). The base 208 may include an appropriate insert for receiving the bolts passing through holes 401 and 402, securing the sensor element 201 to the base 208. Holes 403 and 404, in this example, are adapted for receiving first 202 and third linkages 207. The linkages may be secured to sensor element 206 via bolts through holes 405 and 406.

Figure 5:
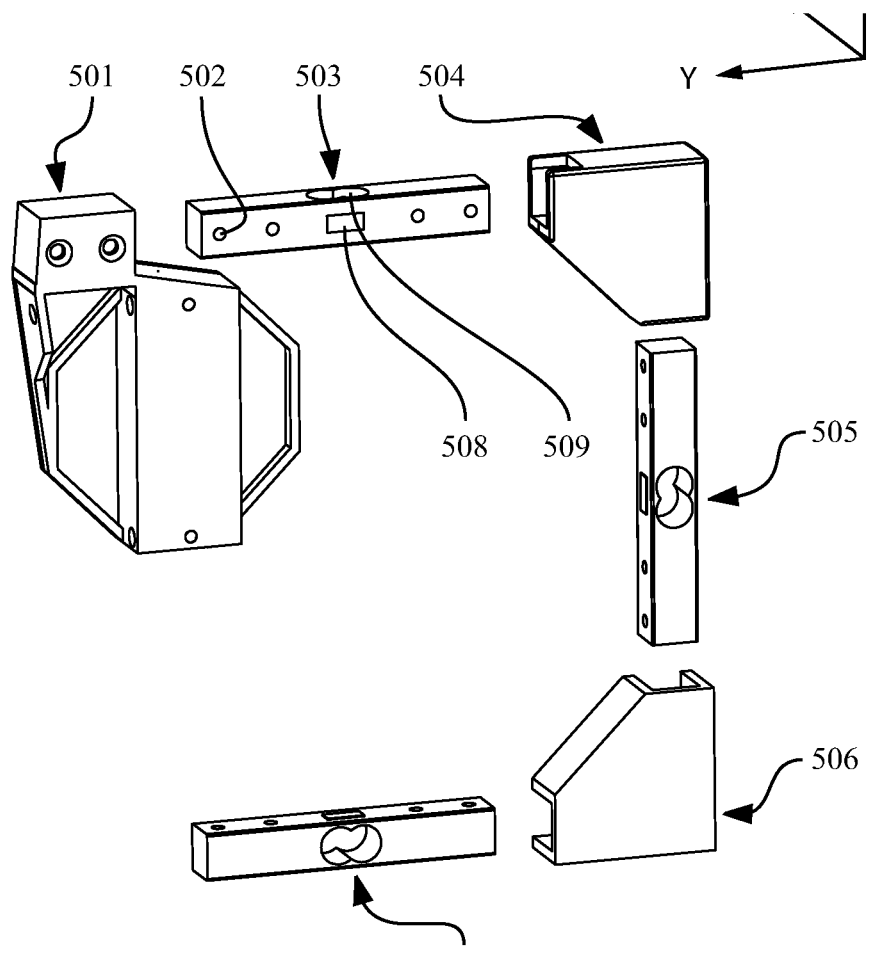
FIG. 5 is an exploded isometric view of an example embodiment of a sensor element illustrating example sensor locations.

An exploded view of an example sensor element showing an example sensor element structure and examples of sensor locations within the sensor element is illustrated in FIG. 5. In this example the sensor element 206 may comprises three plane sensors, 503, 505, and 507. Each plane sensor measures force in each of the axes of reference coordinate system 600. Plane sensors 503, 505, and 507 may be oriented to measure the load applied to the device 100 in the X, Y and Z directions of coordinate system 600, respectively. Each of the three plane sensors are mounted on beams. The plane sensors may be single axis load cells using resistive or capacitive strain gages 508 which adhere over the effective articulation points of the parallel beam created by two overlapping holes 509. The two overlapping holes 509 are drilled through the sensor element body perpendicular to the axis of measurement, with respect to reference coordinate system 600. Each of the beams containing the plane sensors are assembled into a sensor element. For example, the beams adapted to receive plane sensors 503, 505 and 506 are connected by connectors 504 and 505. The beam adapted to receive plane sensor 503 then bolts to suspension connector 501 via bolts though holes 502.

Each of the first and second sensor elements, 201 and 206, shown in FIG. 2, may comprise at least one sensor capable of measuring at least one force in each plane, 106 and 108 (shown in FIG. 1). As discussed the possible sensor locations are illustrated in FIG. 5. The at least one sensor in each plane, 106 and 108, of sensor elements 201 and 206, would be either plane sensors 505 or 507 (in the Y and Z directions of reference coordinate system 600).

Each of the first and second sensor elements 201 and 206, shown in FIG. 2, may comprise at least one sensor capable of measuring at least a perpendicular force along each plane 106 and 108 (shown in FIG. 2). As discussed the possible sensor locations are illustrated in FIG. 5. The at least one sensor capable of measuring at least a force perpendicular to each plane 106 and 108, of sensor elements 201 and 206, would be plane sensor 502 (in the X direction of reference coordinate system 600).

Each of the first and second sensor elements 201 and 206, shown in FIG. 2, may comprise at least one triaxial force sensor. The possible sensor locations are illustrated in FIG. 5, showing three plane sensors, 503, 505, and 507, measuring forces in X, Y and Z. The at least one tiraxial force sensor would include sensors in each of these locations.

Figure 3:
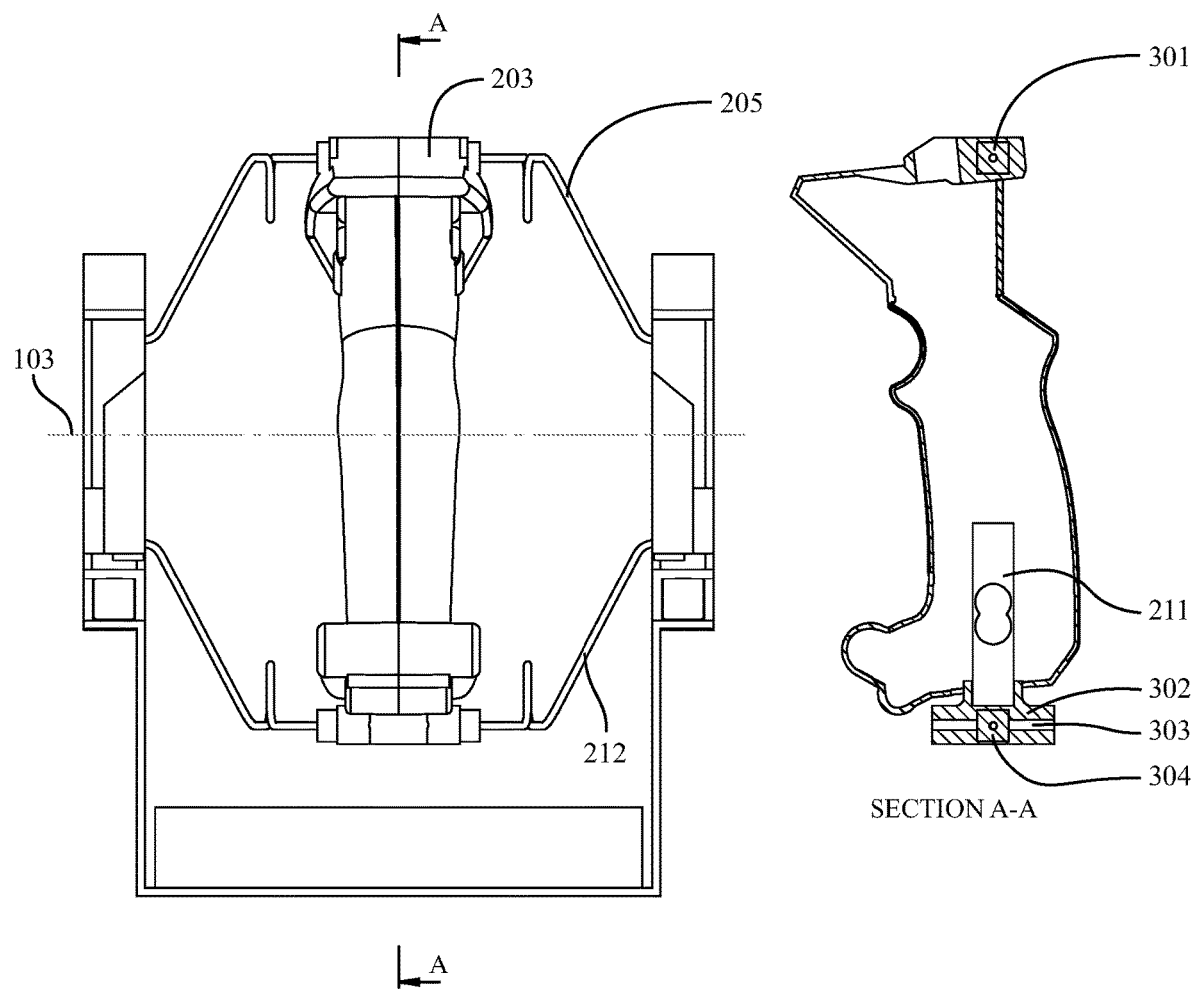
FIG. 3 is a plan view of an example embodiment of the device, showing an example location of the load cell in section A-A (FIG. 3A).

FIG. 2 illustrates device 100 comprising a first moment sensor assembly 210, for measuring a moment or force about the blind axis 103. In this example the first moment sensor assembly 210 is positioned proximate to or on blind axis 103. As shown in FIG. 3 and Section AA, the first moment sensor 211, contained within first moment sensor assembly 210, may also be positioned within the control handle 203 and proximate to or on the blind axis 103. The first moment sensor 211 may be piezoelectric, capacitive or resistive.

Connections of linkages 205 and 212 to the control handle 203 are illustrated in FIG. 3 and Section AA. Section AA shows hole 301 for receiving second linkage 205, and hole 303 for receiving fourth linkage 212.

Additional functions may be added to control device 100. FIG. 2 illustrates a region 204 to accommodate the location of functional controls. The example function controls 903 are illustrated in detail in FIG. 9 mounted on control handle 902. The device may further comprise functional controls 903. This particular example, illustrates the control 903 is a joystick. Other examples of function control 903 include switches, or buttons.

Figure 9:
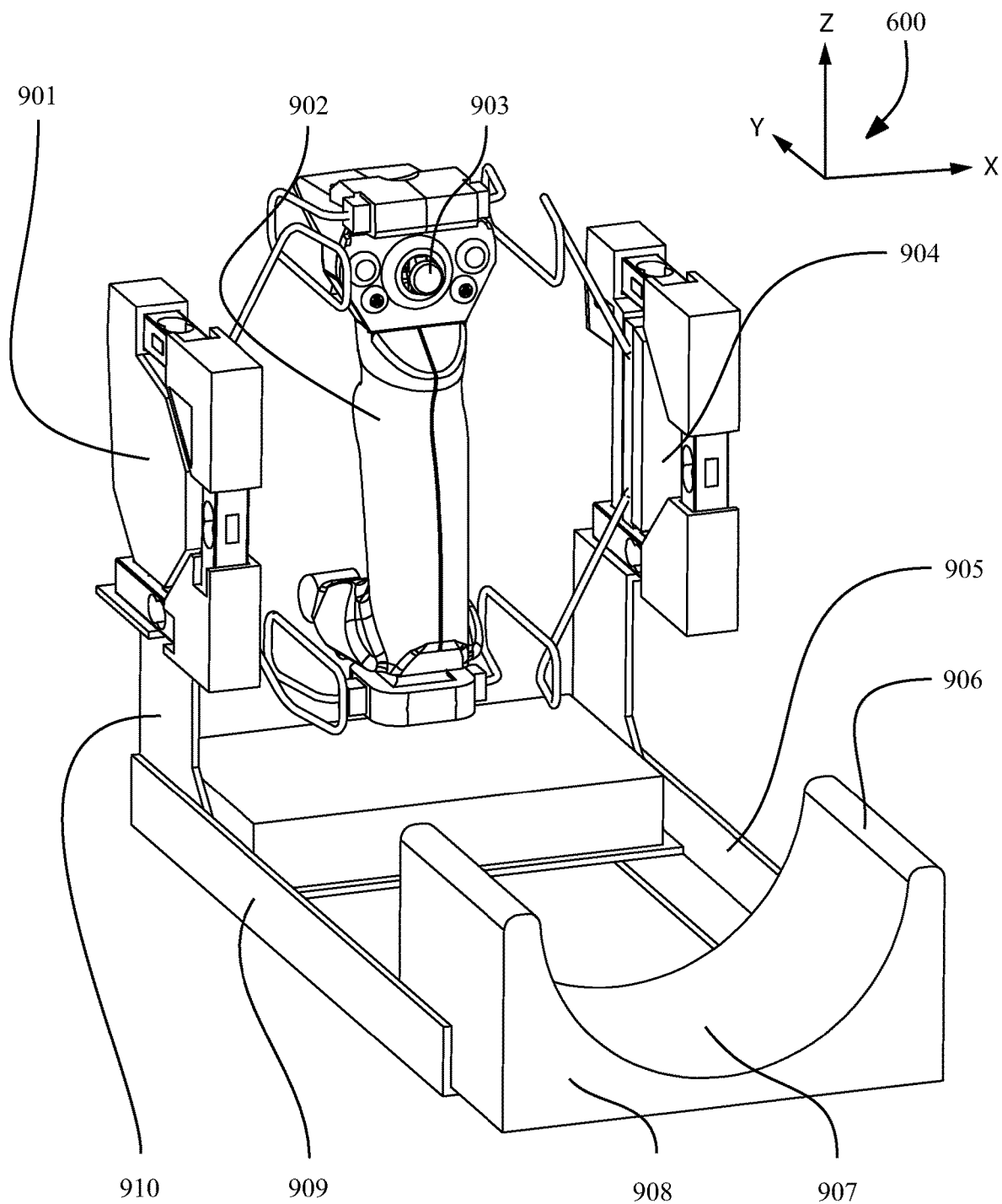
FIG. 9 is an isometric view of an example embodiment of the device illustrating additional function controls and an example armrest.

An alternative embodiment of the control device further comprising an armrest 908 is shown in FIG. 9. In this example armrest 908 connects to base frame 910 via base connecting members 905 and 909. The armrest 908 comprises a concave surface 907 for receiving an arm. The concave surface may have optional padding. The armrest 908 may also comprise side supports 906. The first and second sensor elements 901 and 904 attach to base frame 910.

Figure 7:
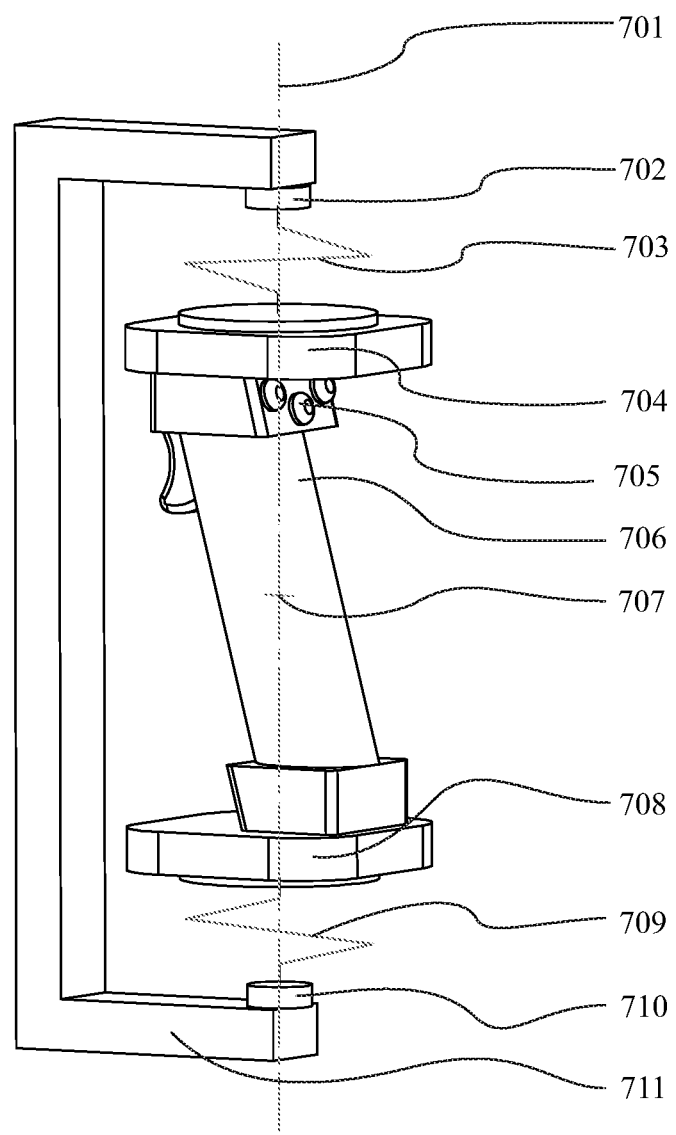
FIG. 7 is an isometric view of an example embodiment of a control device, illustrating an alternative orientation of the sensor elements relative to the handle.

An alternative embodiment of the control handle orientation relative to the base is illustrated in FIG. 7. In this example, the control device further comprises a base frame 711 and at least a first and second linkage, 703 and 709. As discussed with regard to FIG. 2, each first and second linkages, 703 and 709, comprise an elastic suspension portion (shown as 215 in FIG. 2). The first linkage 703 is positioned between and operably connected to the base frame 711 and the first sensor element 704. The second linkage 709 is positioned between and operable connected to the base frame 711 and the second sensor element 708. In this example, the longitudinal axis of the control handle 706 may be coincident or parallel with the blind axis 701. The control handle 706 has center point 707. Alternatively moment sensors 702 and 710 may be located between first and second linkages 703 and 709 and base frame 711.

Figure 11:
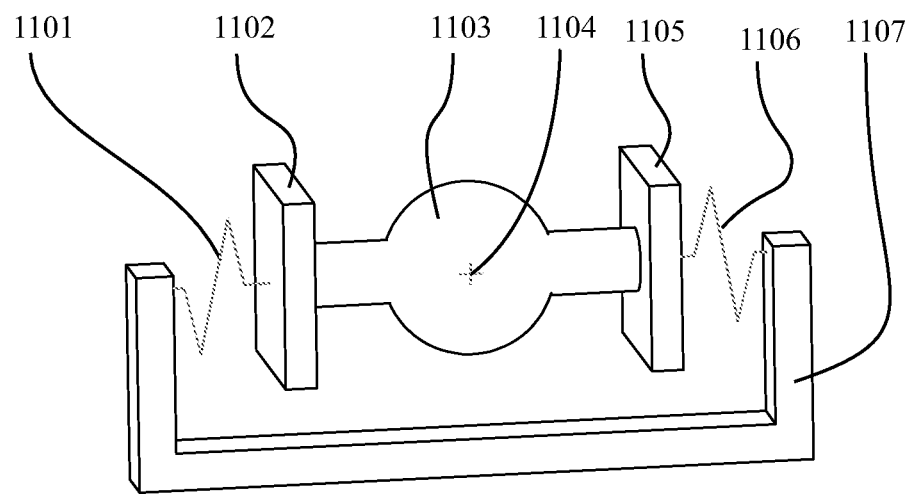
FIG. 11 is an isometric view of an example embodiment of the device illustrating an alternative orientation of the linkages and the sensor elements.

An additional embodiment of the control handle orientation relative to the base is illustrated in FIG. 11, with the control handle 1103 being a sphere. The control handle 1103 has center point 1104. In this example the device further includes base frame 1107 and at least a first and second linkage 1101 and 1106. As discussed with regard to FIG. 2, each first and second linkages 1101 and 1106, comprise an elastic portion (shown as 215 in FIG. 2). The first linkage 1101 is positioned between and operably connected to the base frame 1107 and the first sensor element 1102. The second linkage 1106 is positioned between and operably connected to the base frame 1107 and the second sensor element 1105.

Figure 13:
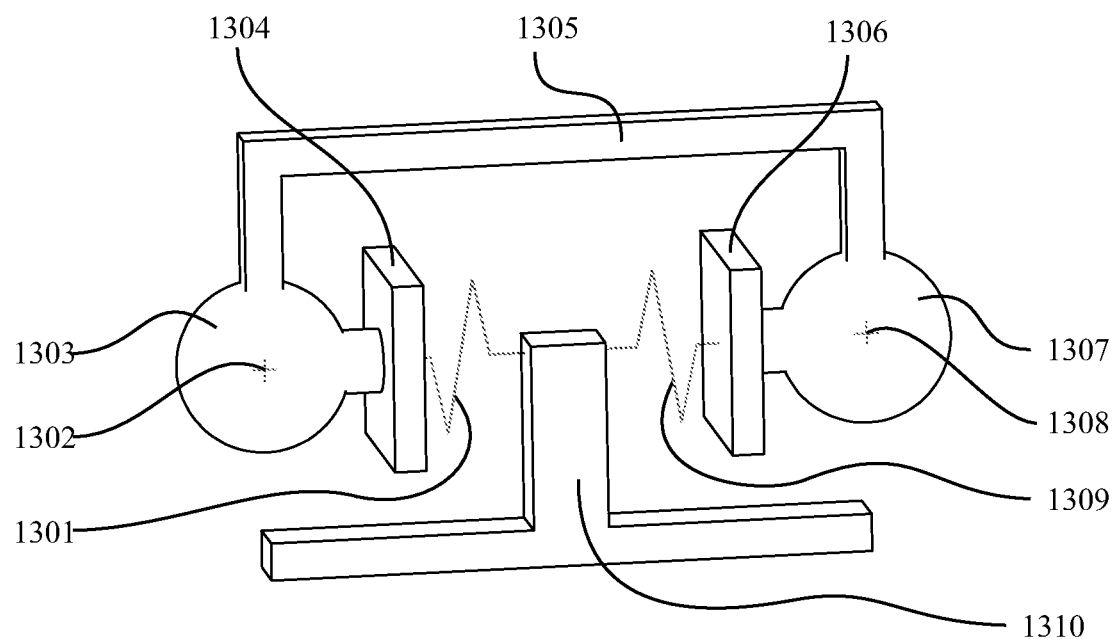
FIG. 13 is an isometric view of an example embodiment of the device illustrating an alternative example of two handles and an alternative orientation of the linkages and the sensor elements.
Figure 14:
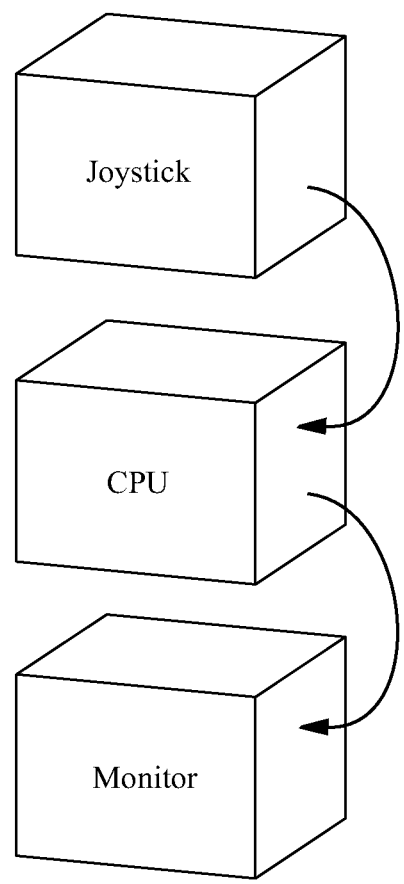
FIG. 14 depicts a schematic drawing of a system comprising each of a control device (e.g. a joystick), a controller such as a central processing unit and a monitor. The arrows depict the operable communication between each component and a direction in which a signal is sent from the control device to a virtual entity on a monitor.
Figure 15:
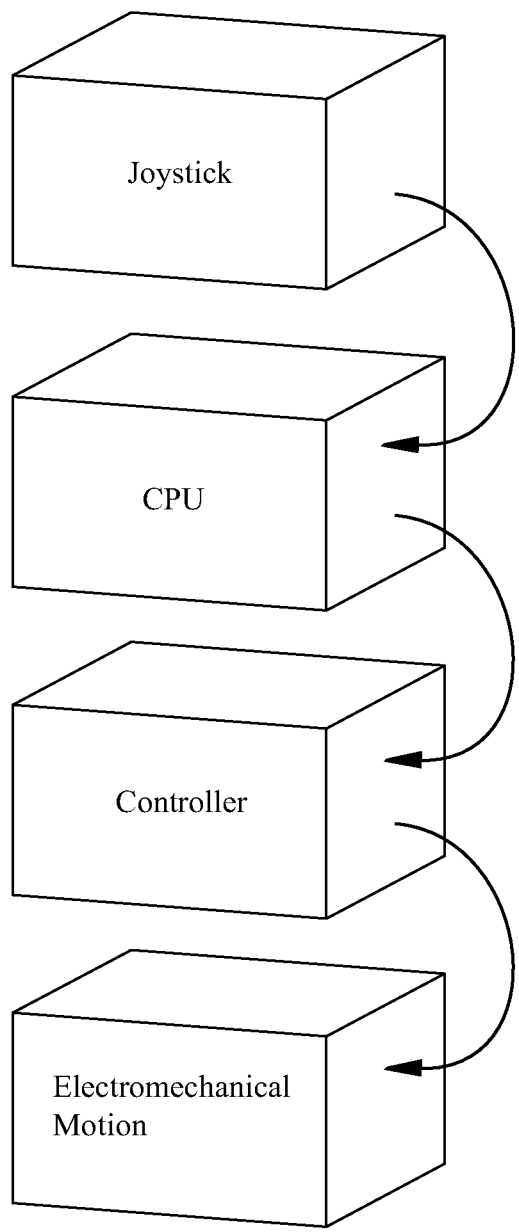
FIG. 15 depicts a schematic drawing of a system comprising each of a control device (e.g. a joystick), a computer processor, a controller capable of sending a signal to an electromechanical object such as a robot, such that movement in the joystick leads to movement in the electromechanical device. The arrows depict the operable communication between each component and a direction in which a signal is sent from the control device to a mobile machine such as a robot or unmanned vehicle.
Figure 16:
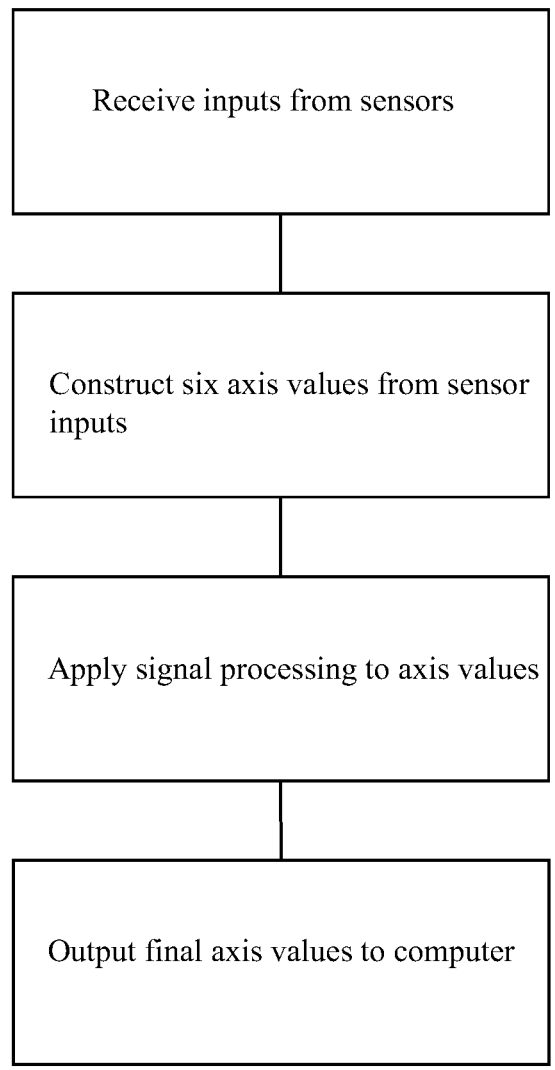
FIG. 16 depicts a flowchart of execution steps a software configured to transmute movement of a control device to movement of a robot, virtual entity or vehicle operably connected to a controller. Output values for each of six degrees of freedom are sent to the controller.

An embodiment of the of the control handle orientation relative to the base, illustrated in FIG. 11, with two control handles, is shown in FIG. 13. The device further includes a base frame 1310, first and second linkages 1301 and 1309, a second control handle 1307, and a handle connecting member 1305. The handle connecting member 1305 connects the control handle 1303 and the second control handle 1307. The control handle 1303 has center point 1302 and the second control handle 1307 has center point 1308. The first linkage 1301 is positioned between and operably connected to base frame 1310 and the first sensor element 1304. The second linkage 1309 is positioned between and operably connected to base frame 1310 and the second sensor element 1306.

Figure 17:
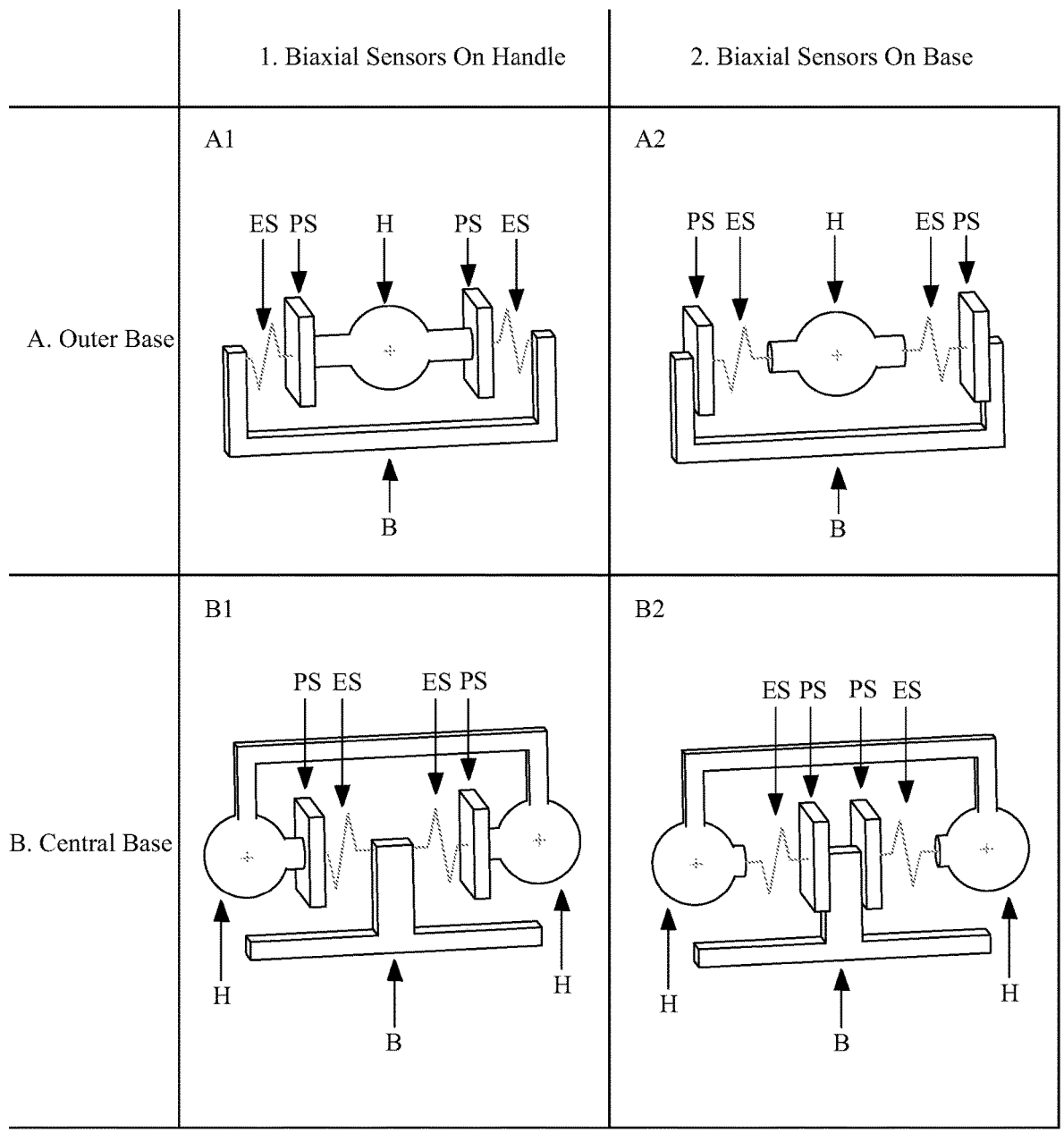
FIG. 17 depicts four different orientations of the control device in which the control device may be configured for operation. ES=elastic suspension; PS=plane sensor; H=control handle; B=base; +=center point of the handle.

FIG. 17 depicts different configuration of the control device. In some embodiments, the control device comprises biaxial sensors on a control handle, and a first and second linkage elastic suspension operably connected to opposite sides of a base. Plane sensors (PS) are positioned parallel to one another and each is physically connected to a linkage. The handle (H) is positioned between the plane sensors and its center defines a center point through which a blind axis traverses and a line perpendicular to the sensor elements housing the plane sensors. In an embodiments, with biaxial sensors on a first and second control handle operably connected to with a central protrusion. A first and second linkages attached to the central protrusion extend laterally to a first and second sensor elements housing plane sensors positioned parallel to one another. Each of two oppositely disposed control handles are operably connected to the sensor element and are operably connected to each other via a linkage spanning a position above a blind axis and the sensor elements housing the plane sensors. FIG. 17 also depicts embodiments in which biaxial sensors are position within the base. In orientation A2, a control handle is positioned between two oppositely positioned but parallel sensor elements housing plane sensors. Two linkages extend in opposite directions laterally out of the control handle and operably connect the control handle to the plane sensors. In this embodiment, a base is mechanically connected to each of the parallel positioned sensor elements but a linkage or connecting element such as a screw, nail or adhesive. In B2, the embodiment comprises two control handles like B1 connected by a linkage spanning in a position above the control handles. The two control handles are connected to a first and second sensor element comprising plane sensors, the first and second sensor elements are positioned parallel to one another and on either side of the control handles in a central or substantially central positon with the control device. A base is operably connected to the first and second sensor elements via a central protrusion of the base and a first linkage and second linkage extend laterally from opposite side of the sensor elements and operably connect the control handles to the sensor elements.

Typically, the present disclosure will be implemented as a return-to-center joystick. In this case, when no external forces are applied, the control handle returns to its center position, at 90° to the plane of a base.

In some embodiments, the control device may have 3, 4, 5, 6, 7, 8, 9, 10 or more sensors.

Sensors may be manufactured with various pressure-sensitive resistor inks, coatings, and sheet materials are known in the art, including: U.S. Pat. No. 4,745,301 (Michalchik); U.S. Pat. No. 4,790,968 (Ohkawa et al.); U.S. Pat. No. 4,315,238 (Eventoff); U.S. Pat. No. 4,856,993 (Maness et al.), U.S. Pat. No. 4,510,079 (Kawai et al), U.S. Pat. No. 4,587,039 (Yamaoka et al), U.S. Pat. No. 3,412,043 (Gilliland), U.S. Pat. No. 4,138,369 (Arai et al), and U.S. Pat. No. 4,302,361 (Kotani et al), each of which are hereby incorporated by reference in their entirety.

In some embodiments, the control device is capable of simultaneous measurement of force at each of a first, second, third, fourth, fifth and sixth degrees of freedom.

System

The disclosure relates to a system comprising the control device disclosed herein and a computer processor. In some embodiments, the system comprises any one or plurality of control devices disclosed herein, a computer processor and an amplifier each of which are operably connected by an electrical circuit. In some embodiments, the computer processor is in operable connection to a monitor and the processor is capable of executing code for a host application program. In some embodiments, the computer processor operates a web browser or is capable of accessing the internet. In some embodiments, the computer processor comprises a computer programmable product disclosed herein. Each of the above identified components may be operably connected by an electronic circuit and/or WiFi connection.

In some embodiments, the disclosure relates to a system including at least one processor and a computer readable memory, said computer readable memory having stored thereon program code for converting force applied to a control device to a movement of an object comprising: means for storing data associated with input and/or signal from the control device; means for converting an input from the control device into a signal corresponding to a plurality of values, each of the values corresponding to at least one degree of freedom of the control device wherein at least one of the values corresponds to each of six degrees of freedom of the control device; a means for sending the plurality of values to a computer interface capable of directing movement of a virtual entity, vehicle or robot. In some embodiments, the disclosure relates to a system that comprises at least one processor, a program storage, such as memory, for storing program code executable on the processor, and one or more input/output devices and/or interfaces, such as data communication and/or peripheral devices and/or interfaces. In some embodiments, the user device and computer system or systems are communicably connected by a data communication network, such as a Local Area Network (LAN), the Internet, or the like, which may also be connected to a number of other client and/or server computer systems. The user device and client and/or server computer systems may further include appropriate operating system software.

The disclosure relates to a system that comprises a system including at least one processor and a computer readable memory, an amplifier capable of converting an electrical signal corresponding to the force applied to a control device to one or a plurality of values corresponding to the force applied to a control device. In some embodiments, the disclosure also relates to a system comprising software, the software capable of executable instruction for conversion of the one or plurality values to a command corresponding to movement of a virtual entity, vehicle or robot.

Information that may be of interest or relevance to a control handle may generated, or selected from a stored set of information on a computer readable memory. For example, the information may be information that the user may input on a functional button of the device such as a button pattern, (e.g., when a slide operation, a scroll operation, a selection of a navigation button, a change in display screen size, a webpage exit option or the like are selected). That is, information may be generated and/or selected so as to be displayed at operation that has not previously been presented to the user on the web page in display. The information may include, for example, text information, graphical information, video, information, options to download or purchase an application, a link to another web page (e.g., within the web page) and/or a different web site, offers for coupons and/or savings on a product and/or service, and/or any other suitable information. In some embodiments, the information may include, for example, advertisements, promotional materials and/or offers, coupons, discounts, and the like. The information selected and/or generated are discussed below in context with different types of webpages.

In some embodiments, the disclosure relates to a system comprising a control handle, an amplifier, a controller, a computer interface and a monitor all of which in operable connection by at least one circuit, such that one or a plurality of signals corresponding to six independently selectable degrees of freedom of the control handle is received by the computer interface in a readable format, the readable format corresponding to movement of a virtual entity on the monitor in each of the six independently selectable degrees of freedom. In some embodiments, the system comprises at least 2, 3, 4, 5, 6, 7, 8, 9, 10 or more amplifiers. In some embodiments, the system has 3, 4, 5, 6, 7, 8, or 9 amplifiers.

The disclosure further relates to a computer program product encoded on a computer-readable storage medium that comprises instructions for performing any of the methods described herein.

One or more embodiments of the disclosed subject matter may control the movement of an object through forces applied to a control device when values are assigned to a presence, absence or magnitude of a force in each of a first, second, third, fourth, fifth or sixth degree of freedom based on the example code below, wherein each load cell input is determined from each a measurement of force applied to each of seven sensors:

Load cell inputs: LX, LY, LZ, RX, RY, RZ, P $X\_AXIS = LX + RX$ $Y\_AXIS = LY + RY$ $Z\_AXIS = LZ + RZ$ $PITCH\_AXIS = P - (Y\_AXIS/2)$ $ROLL\_AXIS = LZ - RZ$ $YAW\_AXIS = LY - RY$ Source Code Version:

```
rawAxis[X_AXIS]=lc[LOADCELL_LX].value+lc
    [LOADCELL_RX].value;

rawAxis[Y_AXIS]=lc[LOADCELL_LY].value+lc
    [LOADCELL_RY].value;

rawAxis[Z_AXIS]=lc[LOADCELL_LZ].value+lc
    [LOADCELL_RZ].value;

rawAxis[PITCH_AXIS]=lc[LOADCELL_PITCH]
    .value-(rawAxis[YAXIS]/2);

rawAxis[ROLL_AXIS]=lc[LOADCELL_LZ].value-
    lc[LOADCELL_RZ].value;

rawAxis[YAWAXIS]=lc[LOADCELL_LY].value-lc
    [LOADCELL_RY].value;
```

In some embodiments, the computer programmable product executes one or more of the following steps:
1. Receive inputs from sensors
2. Construct six axis values from sensor inputs
3. Apply signal processing to axis values
4. Output final axis values to computer In some embodiments, components and/or units of the devices including a computer interface described herein may be able to interact through one or more communication channels or mediums or links, for example, a shared access medium, a global communication network, the Internet, the World Wide Web, a wired network, a wireless network, a combination of one or more wired networks and/or one or more wireless networks, one or more communication networks, an a-synchronic or asynchronous wireless network, a synchronic wireless network, a managed wireless network, a non-managed wireless network, a burstable wireless network, a non-burstable wireless network, a scheduled wireless network, a non-scheduled wireless network, or the like.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine to perform a method and/or operations described herein. Such machine may include, for example, any suitable processing platform, computing platform, computing device, processing device, electronic device, electronic system, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Functions, operations, components and/or features described herein with reference to one or more embodiments, may be combined with, or may be utilized in combination with, one or more other functions, operations, components and/or features described herein with reference to one or more other embodiments, or vice versa.

Although the disclosure has been described with reference to exemplary embodiments, it is not limited thereto. Those skilled in the art will appreciate that numerous changes and modifications may be made to the preferred embodiments of the disclosure and that such changes and modifications may be made without departing from the true spirit of the disclosure. It is therefore intended that the appended claims be construed to cover all such equivalent variations as fall within the true spirit and scope of the disclosure.

The disclosure also relates to a computer program product encoded on a computer-readable storage medium comprising instructions for:

receiving a value corresponding a force applied by a user to a control device, the value at least partially based upon a force applied to a sensor within the control device;

assigning an electrical signal to at least one degree of freedom at least partially based upon the value.

sending the electrical signal to a computer interface associated with movement of an virtual entity, robot or vehicle such that movement of the virtual entity, robot or vehicle correlates to the at least one degree of freedom.

In some embodiments, the computer program product comprises instructions for directing and/or displaying movement of the virtual entity, the movement at least partially on the force applied to the control device by a user.

The disclosure relates to a computer program product encoded on a computer-readable storage medium comprising instructions for:

receiving a value corresponding to a force applied by a user to a control device, the value at least partially based upon measurements of a first, second, third, fourth, fifth, sixth sensor within the control device;

assigning a first electrical signal to a first degree of freedom at least partially based upon the measurement of the first sensor;

assigning a second electrical signal to a second degree of freedom at least partially based upon the measurement of the second sensor;

assigning a third electrical signal to a third degree of freedom at least partially based upon the measurement of the third sensor;

assigning a fourth electrical signal to a fourth degree of freedom at least partially based upon the measurement of the fourth sensor;

assigning a fifth electrical signal to a fifth degree of freedom at least partially based upon the measurement of the fifth sensor;

assigning a sixth electrical signal to a sixth degree of freedom at least partially based upon the measurement of the sixth sensor;

sending each of the first, second, third, fourth, fifth and sixth electrical signals to a computer interface associated with movement of an virtual entity, robot or vehicle, such that movement of the virtual entity, robot or vehicle correlates to the first, second, third, fourth, fifth, and sixth degrees of freedom.

The disclosure also relates to a computer program product encoded on a computer-readable storage medium comprising instructions for:

receiving a plurality of values, each value corresponding to a force applied by a user to a control device, the value at least partially based upon measurements of at least a first, second, and third sensor within the control device;

assigning a first electrical signal to a first degree of freedom at least partially based upon the measurement of one or a plurality of sensors;

assigning a second electrical signal to a second degree of freedom at least partially based upon the measurement one or a plurality of sensors;

assigning a third electrical signal to a third degree of freedom at least partially based upon the measurement one or a plurality of sensors;

assigning a fourth electrical signal to a fourth degree of freedom at least partially based upon the measurement one or a plurality of sensors;

assigning a fifth electrical signal to a fifth degree of freedom at least partially based upon the measurement one or a plurality of sensors;

assigning a sixth electrical signal to a sixth degree of freedom at least partially based upon the measurement one or a plurality of sensors;

sending each of the first, second, third, fourth, fifth and sixth electrical signals to a computer interface associated with movement of virtual entity, robot or vehicle, such that movement of the virtual entity, robot or vehicle correlates to the first, second, third, fourth, fifth, and sixth degrees of freedom.

Methods

The disclosure relates to a method of detecting six degrees of freedom of a control device simultaneously comprising: applying force to a control handle of the control device disclosed herein; and measuring a plurality of forces simultaneously at a plurality of sensors positioned within a control handle of the control device disclosed herein operated by a user, the plurality of force measurements corresponding to a first, second, third, fourth, fifth and sixth degrees of freedom of the control handle.

In some embodiments, the disclosure relates to a method of detecting and/or quantifying a force applied by a user manipulating a control device; assigning the force to an electrical signal value corresponding to a vector of movement of the control device. In some embodiments, the methods further comprise a step of sending the value to a software system configured to direct movement of a virtual entity, robot or vehicle associated with the vector of movement. The methods, in some embodiments, sending a value through a computer interface, the computer interface comprising a host application program such as a video or computer game, medical simulation, flight simulation, scientific analysis program, operating system, graphical user interface, or other application program.

The disclosure also relates to a method of controlling or directing the movement of a mobile machine or mobile object comprising: measuring a plurality of forces simultaneously at a plurality of sensors positioned within a control handle of the control device disclosed herein operated by a user, the plurality of force measurements corresponding to a first, second, third, fourth, fifth and sixth degrees of freedom of the control handle, converting, in an amplifier or computer processor in operable connection with the control device, the plurality of force measurements to a plurality of respective values, the values corresponding to the first, second, third, fourth, fifth and sixth degrees of freedom of the control handle; and translating, through a computer interface in operable communication with the mobile machine or mobile object, the plurality of respective values into commands for electromechanical motion of the mobile machine or mobile object corresponding to force applied in the first, second, third, fourth, fifth and sixth degrees of freedom of the control handle by the user.

The disclosure also relates to a method of controlling or directing movement of a virtual entity comprising:

measuring a plurality of forces simultaneously at a plurality of sensors positioned within a control handle of the control device disclosed herein operated by a user, the plurality of force measurements corresponding to a first, second, third, fourth, fifth and sixth degrees of freedom of the control handle;

converting, in an amplifier or computer processor in operable connection with the control device, the plurality of force measurements to a plurality of respective values, the values corresponding to the first, second, third, fourth, fifth and sixth degrees of freedom of the control handle; and translating, through a computer interface in operable communication with a monitor displaying a virtual entity, the plurality of respective values into commands for motion of the virtual entity corresponding to force applied in the first, second, third, fourth, fifth and sixth degrees of freedom of the control handle by the user.

In some embodiments, the disclosure relates to a computer-implemented method of detecting a plurality of forces applied to a control device disclosed herein. In some embodiments, a user of the control device accesses a processor, the method comprising: detecting a user accessing a control device; detecting one or a plurality of forces applied to on the control device, transmuting the one or plurality of forces into an electrical signal through a sensor. In some embodiments, the method further comprises delivering the signal to a processor operably connected to a vehicle, robot or virtual entity, such that the processor is able to direct movement of the vehicle, robot, or entity via a computer interface comprising a host application program. In some embodiments, the disclosure relates to a method of user display segmentation. In some embodiments, the disclosure relates to a computer-implemented method of display segmentation, the method comprising: detecting a user accessing a webpage; collecting data about the position of the control device; and segmenting the a monitor in operable communication with the control device into coordinates that correspond to pixilation based upon the control device data.

The invention claimed is:

1. A control device comprising:
   a base;
   a control handle comprising an elongate grip portion, and a center point along a longitudinal axis of the control handle; and
      a plurality of linkage assemblies coupled between the base and the control handle, the plurality of linkage assemblies defining a linkage axis extending therebetween, the elongate grip portion being transverse to the linkage axis;
   each linkage assembly comprising
      at least one flexible member, and
      at least one force sensing assembly, the at least one flexible member and the at least one force sensing assembly coupled in series to the control handle, the at least one force sensing assembly comprising first and second force sensing elements having respective force sensing axes being perpendicular to each other,
      each of the first and second force sensing elements comprising an axis of force sensitivity,
      the at least one flexible member of the plurality of linkage assemblies defining an elastic system, the elastic system having an elastic center at the center point of the control handle.

2. The control device of claim 1, wherein the first and second force sensing elements are connected in series to each other.

3. The control device of claim 1, wherein the control device further comprises a blind axis defined as passing through the elastic center of the elastic system, and passing through a center of the at least one flexible member of each linkage assembly; wherein the control device further comprises a third force sensing element measuring moments about the blind axis, and coupled in series with at least one linkage assembly; and wherein the third force sensing element comprises one of: a piezoelectric sensor, a capacitive sensor, or a resistive sensor.

4. The control device of any of claim 3 wherein at least one of the first, second, and third force sensing elements is configured to measure a force along the blind axis.

5. The control device of claim 3, wherein the axis of force sensitivity of each force sensing element of each linkage assembly is perpendicular or parallel to the blind axis.

6. The control device of claim 1, wherein the first and second force sensing elements comprise a sensor type chosen from: a piezoelectric sensor, a capacitive sensor, or a resistive sensor.

7. The control device of claim 1, wherein the control handle comprises one of a sphere, an elongate member, or a pocket.

8. The control device of claim 1, further comprising an arm rest coupled to the base and having a concave surface for receiving an arm.

9. The control device of claim 1, further comprising a plurality of functional controls carried by the control handle.

10. The control device of claim 1, further comprising an additional control handle, and a handle connecting member coupling the control handle with the additional control handle.

11. The control device of claim 1, wherein the at least one flexible member comprise at least one of metal, silicone, rubber, thermoplastic, or elastomer.

12. The control device of claim 1, wherein the first and second force sensing elements each comprises a strain gauge; and wherein the at least one force sensing assembly comprises a substrate carrying the first and second force sensing elements.

13. A computing system comprising:
   a processor; and
   a control device coupled to the processor and comprising
      a base,
      a control handle comprising an elongate grip portion, and a center point along a longitudinal axis of the control handle, and
      a plurality of linkage assemblies coupled between the base and the control handle, the plurality of linkage assemblies defining a linkage axis extending therebetween, the elongate grip portion being transverse to the linkage axis,
   each linkage assembly comprising
      at least one flexible member, and
      at least one force sensing assembly, the at least one flexible member and the at least one force sensing assembly coupled in series to the control handle, the at least one force sensing assembly comprising first and second force sensing elements having respective force sensing axes being perpendicular to each other,
      each of the first and second force sensing elements comprising an axis of force sensitivity,
      the at least one flexible member of the plurality of linkage assemblies defining an elastic system, the elastic system having an elastic center at the center point of the control handle.

14. The computing system of claim 13, wherein the first and second force sensing elements are connected in series to each other.

15. The computing system of claim 13, wherein the control handle further comprises a blind axis defined as passing through the elastic center of the elastic system, and passing through a center of the at least one flexible member of each linkage assembly; wherein the control device further comprises a third force sensing element measuring moments about the blind axis, and coupled in series with at least one linkage assembly; and wherein the third force sensing element comprises one of: a piezoelectric sensor, a capacitive sensor, or a resistive sensor.

16. The computing system of claim 13, wherein the first and second force sensing elements comprise a sensor type chosen from: a piezoelectric sensor, a capacitive sensor, or a resistive sensor.

17. A method of operating a control device coupled to a processor, the control device comprising a base, a control handle comprising an elongate grip portion, and a center point along a longitudinal axis of the control handle, and a plurality of linkage assemblies coupled between the base and the control handle, the plurality of linkage assemblies defining a linkage axis extending therebetween, the elongate grip portion being transverse to the linkage axis, each linkage assembly comprising at least one flexible member, and at least one force sensing assembly, the at least one flexible member and the at least one force sensing assembly coupled in series to the control handle, the at least one force sensing assembly comprising first and second force sensing elements having respective force sensing axes being perpendicular to each other, each of the first and second force sensing elements comprising an axis of force sensitivity, the at least one flexible member of the plurality of linkage assemblies defining an elastic system, the elastic system having an elastic center at the center point of the control handle, the method comprising:

detecting six degrees of freedom of the control device; and sending signals based upon the six degrees of freedom to the processor, simultaneously comprising.

18. The method of claim 17, wherein the first and second force sensing elements are connected in series to each other.

19. The method of claim 17, wherein the control handle further comprises a blind axis defined as passing through the elastic center of the elastic system, and passing through a center of the at least one flexible member of each linkage assembly; wherein the control device further comprises a third force sensing element measuring moments about the blind axis, and coupled in series with at least one linkage assembly; and wherein the third force sensing element comprises one of: a piezoelectric sensor, a capacitive sensor, or a resistive sensor.

20. The method of claim 17, wherein the first and second force sensing elements comprise a sensor type chosen from: a piezoelectric sensor, a capacitive sensor, or a resistive sensor.

* * * * *